United States Patent
Bradley

[15] 3,637,081
[45] Jan. 25, 1972

| | | |
|---|---|---|
| [54] | LIQUID TREATMENT SYSTEM | |
| [72] | Inventor: | William E. Bradley, New Hope, Pa. |
| [73] | Assignee: | Puredesal, Inc., Levittown, Pa. 19057 |
| [22] | Filed: | Apr. 9, 1970 |
| [21] | Appl. No.: | 27,049 |
| [52] | U.S. Cl. | 210/110, 210/134, 210/321, 210/416, 210/433 |
| [51] | Int. Cl. | B01d 31/00, B01d 13/00 |
| [58] | Field of Search | 210/416, 321, 90, 433, 101, 210/110, 134, 137 |

[56] References Cited

UNITED STATES PATENTS 3,355,382  11/1967  Huntington ............................. 210/22
3,369,667  2/1968  Clark et al. ........................ 210/321 X
3,405,058  10/1968  Miller .............................. 210/321 X

OTHER PUBLICATIONS

1968 Saline Water Conversion Report, received in Patent Office June 10, 1969, for sale by Sup't. of Documents, Washington, D.C., 489 pp., pp. 369–374 relied on.

*Primary Examiner*—Frank A. Spear, Jr.
*Attorney*—Thomas M. Ferrill, Jr. and Roger Norman Coe

[57] ABSTRACT

A liquid treatment system, involving pressure exchange pumps for positive control of reverse osmosis liquid purification, which overcomes corrosion and supersaturation problems.

11 Claims, 2 Drawing Figures

PATENTED JAN 25 1972 3,637,081

INVENTOR.
William E. Bradley
BY
ATTORNEY.

LIQUID TREATMENT SYSTEM

BACKGROUND OF THE INVENTION

The present invention relates to a liquid treatment system and more particularly, to a liquid treatment system which uses pressure exchange pumps for positive control of reverse osmosis water purification.

The necessity of discovering a method of converting polluted, saline and brackish water into fresh water at a reasonable cost has become increasingly apparent within the past several years. Fresh water is commonly defined as water containing less than 1,000 parts per million of dissolved salts. According to U.S. Public Health Service Standards, drinking water should preferably contain less than 500 parts per million of dissolved salts.

The salinity of the waters available for conversion varies greatly. Oceans are fairly uniform averaging about 35,000 parts per million of dissolved salts. However, in the Persian Gulf it is nearly 40,000 parts per million; in the Chesapeake Bay, about 15,000 parts per million; and in the Baltic Sea, only 7,000 parts per million of dissolved salts. Any water less salty than the ocean but containing more than 1,000 parts per million of dissolved salts, is normally defined as being brackish.

Common salt, sodium chloride, accounts for most of the saltiness of sea water. However, sea water contains small amounts of many other salts, including; approximately 3,807 parts per million of magnesium chloride; approximately 1,658 parts per million of magnesium sulphate; approximately 1,260 parts per million of calcium sulphate; approximately 863 parts per million of potassium sulphate; approximately 123 parts per million of calcium carbonate; and approximately 76 parts per million of magnesium bromide.

The principal problem to date in the purification of brackish, saline or polluted water has not been finding a technically feasible system for obtaining the desired purification it has been the inability to obtain such purification at a cost low enough to make it economically practical. One of the most promising systems which has been studied is the reverse osmosis system. This system makes use of the characteristic behavior of solutions diffusing through a membrane according to the phenomenon of osmosis. For example, it is well known that if a salty solution is divided from a less salty solution by an osmotic membrane which is impermeable to salt but not to water, water passes through the membrane into the more salty solution, tending to equalize the salinity on both sides of the membrane. The membrane process can be reversed by applying to the more concentrated solution a mechanical pressure greater than the osmotic pressure acting upon the water. That is, the "reverse osmosis" forces water with a small amount of dissolved solid to flow through or permeate the membrane out of the salty solution, while the membrane holds back the salt ions. The rate of permeation is directly related to the membrane constant, the area of the membrane, and the pressure employed and inversely related to the thickness of the membrane. Thus, a polymer membrane of high permeability, high selectivity, high stability and long life is of prime importance.

Potentially, the reverse osmosis process is the lowest cost process available for desalting water. There is no phase change required in this process and the theoretical energy requirements are therefore low. In addition, the process is relatively simple to operate and has inherent flexibility in both use and plant expansion capability.

Membranes made of cellulose acetate have been used to remove 90 to 95 percent of salt from sea water in one pass. Unfortunately, cellulose acetate lacks high stability and long life. Nylon, in the form of hollow fibers, is now being employed as a promising membrane used in reverse osmosis processes. A shell and tube configuration called a permeator, which is similar to a single-end heat exchanger, is used for housing the hollow fibers employed as membranes. The fibers at one end are potted or encapsulated in an epoxy resin, which serves as a pressure seal. These permeators for liquid purification or desalinization have three pipe connections: (1) an input connection or feed connection through which untreated liquid enters at high pressure; (2) a reject output through which liquid having higher salt concentration than the liquid entering through the input or feed connection emerges from the permeator at high pressure; and (3) a permeate output connection from which purified and/or desalinated liquid emerges at a low-positive pressure. In one typical embodiment, the reject liquid, e.g., water, emerges at substantially the inlet pressure, which is of the order of 600 pounds per square inch.

Inside the permeator, the flow of liquid through the shell may be countercurrent to the flow of the permeate or product liquid inside the hollow fibers. In conventional operation, a high-pressure pump is used to introduce the solution to be processed into the shell of the permeator. Product liquid, e.g., water, permeates through the walls of the hollow fibers inside the permeator and travels along the interior of the fibers through a bulkhead into the permeate output section. The portion of the feed solution which fails to permeate through the hollow fiber walls is continuously discharged from the other end of the permeator.

Two problems occur which limit the effectiveness of permeators for purification of saline, brackish and polluted waters. First of all, conversion has had to be limited in permeators because of the concentration of salts which takes place in the permeator shell. It is essential to control the rate of reject flow by some means in order to avoid supersaturation with concomitant precipitation of solids and clogging of the permeator especially when the reject flow is small. If too much reject flow is permitted, excessive water input is required which can result in an overloading of the input pump and waste of water. Secondly, there is the problem of corrosion and scale deposition, particularly when the salt in the reject stream becomes concentrated.

It has been customary to utilize a needle valve and/or a calibrated orifice, requiring manual adjustment, to regulate the reject flow from the permeator. If the reject stream becomes supersaturated, the calibrated orifice method of reject control becomes unreliable due to scale deposition on the walls of the orifice and/or needle valve. A metering or proportioning pump of conventional design is not convenient because the valve system in such a pump requires an outlet pressure higher than the inlet pressure so that a pressure-regulating valve following such a pump must be added. In addition, such a proportioning pump is expensive if designed for continuous use and may be damaged by abrasion from the small amounts of suspended solids which are likely to be present in the reject water. Turbines cannot be rigidly geared to control reject flow rate with adequate accuracy and deteriorate due to scale deposition.

The use of filters to reduce the amount of suspended solids concentration to an acceptable level in the feed stream, the use of baked on epoxy coatings for corrosion protection in the permeator and the use of sequestering agents, such as sodium tripolyphosphate and sodium hexametaphosphate, to inhibit precipitation of calcium salts, such as calcium carbonate and calcium sulphate, have permitted the operation of permeators (a) at higher concentrations and (b) for longer periods of time than would otherwise be possible. These steps, however, have not eliminated or cured existing problems the steps have merely delayed somewhat the time for the effects of the problems to appear.

SUMMARY OF THE INVENTION

An object of the present invention is to provide a reverse osmosis liquid treatment system which is economically practical and relatively simple to construct and install.

Another object of the present invention is to provide a reverse osmosis liquid treatment system which permits improved stability of permeator operation and freedom from periodic manual adjustments.

A further object of the present invention is to provide a reverse osmosis liquid treatment system which requires low maintenance and has the ability to tolerate suspended solids in the permeator reject stream.

With these and other objects in mind, the reverse osmosis liquid treatment system of the present invention embodies an input "compressor" pump capable of supplying untreated liquid under pressure, a permeator for separating relatively pure liquid, such as water, from the untreated liquid input material, and an output "decompressor" pump for pumping in the reject stream from the permeator. A positive displacement pump which is self-cleaning and which is capable of operating as a motor is employed as the output pump. In one preferred embodiment positive displacement pumps, such as positive displacement screw conveyor-type pumps, are employed for both the input and output pumps.

The input and output pumps are preferably connected by means of a pulley, gears or other suitable means to an electric motor which is operated at a fixed or variable speed in order to maintain the required pressure for the reverse osmosis liquid treatment system while maintaining a predetermined ratio between input pump speed and output pump speed.

Alternatively, both pumps may be driven by separate electric motors such as synchronous motors or induction motors whereby a predetermined ratio of flow between the two pumps in maintained. Each pump may be belt or gear connected to its proper motor so that the speed ratio can be made equal to a desired value. In this arrangement, the decompressor pump operates as a hydraulic motor, returning the energy of the reject stream decompression to the electric power supply, thereby reducing the net power consumption or the system. This method of positive displacement flow control can be considered as "electrical gearing."

BRIEF DESCRIPTION OF THE DRAWING

Other and further objectives, advantages, and features of the invention will be apparent to those skilled in the art from the following detailed description thereof, taken in conjunction with the accompanying drawings, in which.

DESCRIPTION OF THE PREFERRED EMBODIMENTS

Figure 1:
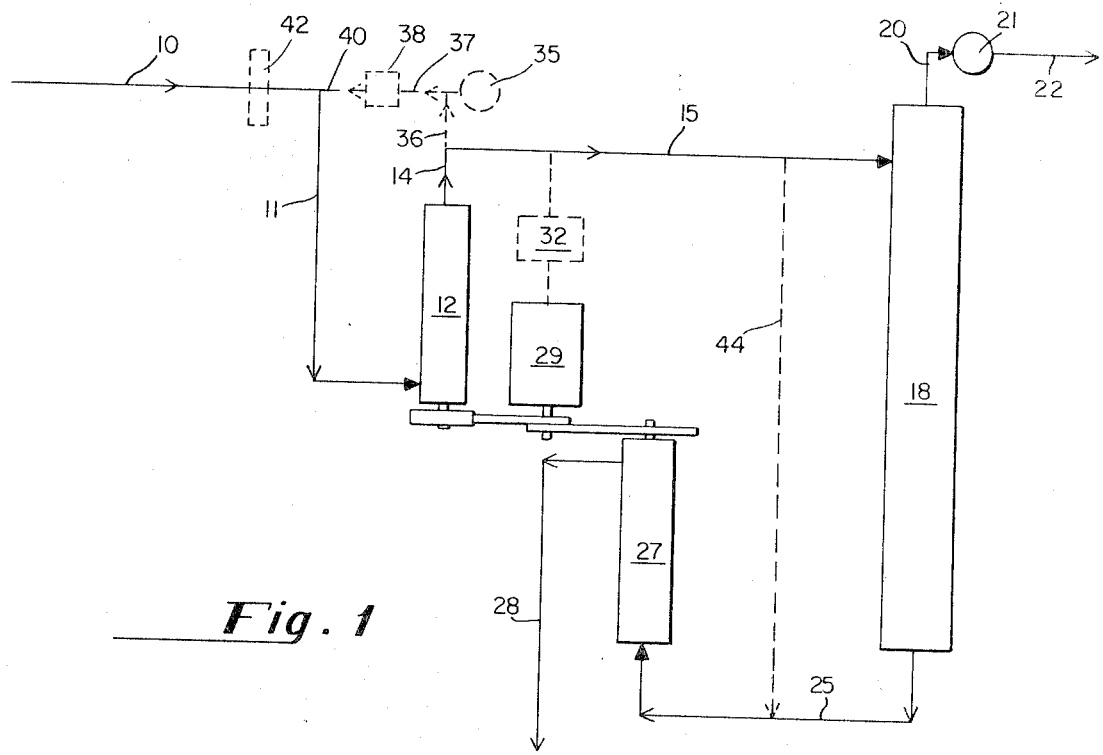
FIGS. 1 and 2 are diagrammatic illustrations of different embodiments of the present invention.

Referring to FIG. 1, untreated liquid is fed through conduits 10 and 11 into input pump 12. The liquid is then pumped through conduits 14 and 15 into permeator 18. Purified liquid, such as water, emerges at low-positive pressure from the permeate output connection and passes through conduit 20. An output flow gauge 21 is normally used to measure the permeate output flow from the permeator. The treated material is then passed through conduit 22 for use or storage. The reject output from the permeator passes through conduit 25 into pump 27 and then into conduit 28 for discharge.

Advantageously, both input pump 12 and output pump 27 can be connected to the same motor 29, through a suitable gear or belt drive. Motor 29 can be regulated by pressure operated speed control means 32 which is dependent upon the pressure in conduit 15.

A pressure gauge 35 may be used to sense the pressure in conduits 36 and 37 and operate a pressure regulating relief valve 38. The input liquid passing through the pressure regulating relief valve 38 is then passed to conduit 40 and mixed with the incoming liquid from conduit 10. The pressure regulating relief valve 38 is desirable in order to maintain a predetermined pressure in the discharge from input pump 12. Alternatively, the input or "compressor" pump, which may be a high-pressure reciprocating pump, a gear pump, a centrifugal feed pump or a self-priming, positive displacement pump, can have a variable speed drive which is regulated by suitable means, such as pressure operated speed control means 32.

Pretreatment of the input feed stream in conduit 10 can be accomplished at 42 where chemicals are added to inhibit precipitation of calcium or other polyvalent cations, adjust the pH and/or filter undissolved solids of a particular size, e.g., remove undissolved solids which have a diameter over 10 microns.

The preferred output pump is a self-priming, positive displacement pump, which operates like a precision screw conveyor with a rotor turning inside a stator. A compression fit exists between the rotor and stator so as the rotor turns within the stator cavities are formed which progress toward the discharge end of the pump. The rotor can be made of metal or plastic. Typically, however, the rotor is either (a) chrome-plated tool steel which has high-abrasion resistance or (b) stainless steel which has the advantageous characteristic of being corrosion resistant. While the stator can be made of tool steel, stainless steel or a plastic material, such as Bakelite, normally the inside of the stator is lined with natural or synthetic rubber to obtain improved volumetric efficiency when pumping the permeator liquid reject output.

The advantages of the output pump described herein include the fact that the pump is capable of handling all fluids with a minimum of turbulence, agitation and pulsation; it will pump liquids containing a high percentage of solids; it is essentially self-cleaning; and it can readily be made corrosion resistant. Thus, the aforementioned output pump can advantageously be employed in the liquid treatment system of the present invention to overcome the problems which have to date limited the effectiveness of permeators for the purification of saline, brackish, and polluted water.

Since the helical rotor of the positive displacement pump continuously flexes and wipes the stator during its operation, no scale accumulation is permitted to occur. As a positive displacement pump, the flow rate of the pump varies directly with rotational speed, and hence the reject flow may be made a predetermined fraction of the input flow to the permeator by using appropriate feedback connections providing a fixed speed ratio between the input pump and the reject control pump. Thus, the reject control pump actually runs as a hydraulic motor, helping to turn the input pump, and this hydraulic motor action of the reject control or "decompressor" pump permits the input "compressor" pump to operate with somewhat less driving power required. In large installations, the resulting economy of electric power is important, especially at low conversion ratios. Thus, the reject ratio determines conversion ratio and can be adjusted by changing the feedback arrangement, e.g., pulley diameters, gear sizes, etc.

A variable speed transmission provides a refined means to control reject ratio, although a conventional gear box with a gear shift mechanism is a satisfactory alternative. The permeator input pressure may be fed back to control the speed of the input pump, which is held to a fixed speed ratio with the reject pump. If the pressure is too high, such a feedback mechanism adjusts a variable speed electric motor or other variable speed prime power source, or may adjust a variable ratio transmission between a fixed speed motor and the input pump in such a way as to reduce the speed and hence the pressure.

To permit the removal, replacement or cleaning of permeator 18, conduit 44 may be used to transmit the input liquid in conduit 15 directly into conduit 25.

If desired, multiple permeators can be used in place of the single permeator shown in FIG. 1. Where multiple permeators are employed, they may be connected either in series, in parallel and various combinations thereof. The use of multiple permeators is particularly advantageous when high conversion (i.e., the volume of permeate expressed as a percentage of the feed solution volume) is desired. Conversion can be controlled by varying the speed ratio between the reject pump and the input pump. In the purification of water supplies and in the concentration of industrial waste streams it is normally economically desirable to operate at as high a conversion as possible. HOwever, for a given feed solution as conversion is increased the average solute concentration in the permeator shell also increases. If permeators are operated in series, the first permeator yields water of lowest salinity, the second, third, etc., of successively higher salinity due to progressively greater solute concentration. Such an arrangement makes available a plurality of outputs of water of different degrees of solute concentrations which, if desired, may be used for different purposes.

Obviously, the size of the permeator or permeators may be varied the limiting factor being the thickness of the tube sheet and the resulting greater pressure drops as the product fluid flows through the portion of the fibers embedded in the tube sheet. A typical 12 inch diameter by 7 foot permeator shell contains 15 to 30 million hollow fibers with surface areas of 50,000 to 80,000 square feet. Such a permeator is capable of producing about 7,500 gallons per day of product water sufficient water to fill the needs of about 50 people in a city.

Figure 2:
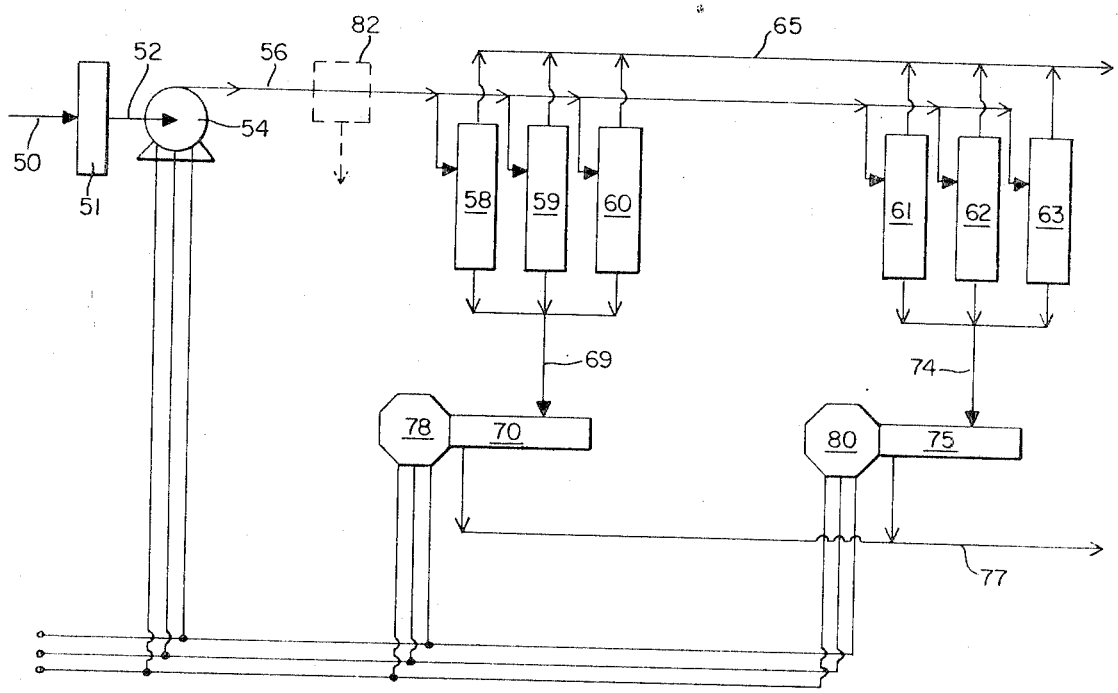

In the embodiment illustrated in FIG. 2, electric power feedback is employed to eliminate mechanical power linkages between the input and output pumps and the electric motor used to drive these pumps. In this embodiment, a positive displacement decompressor or hydraulic motor controls the reject stream flow and also derives energy from the decompression of the reject stream down to ambient pressure from the high pressure in the interior of the permeator. It is known that an ordinary induction electric motor will operate as a generator and deliver electric power if it is connected to a source of mechanical power which causes it to rotate slightly faster than synchronous speed. Thus, if a hydraulic reject control motor is connected, either directly or motor" a short belt or gear connection, to an electric induction motor and the electric motor is connected to the same electrical supply used for the compressor pump, the decompression power turns the hydraulic motor which turns the electric "motor38 causing it to operate as a generator sending electric power back into the electrical system. Such an arrangement not only results in power economy, but is a convenient physical arrangement in that it eliminates the necessity for physical proximity of the reject pump, the compressor pump and any electric motor or electric motors mechanically coupled to each or both of these pumps. Another advantage of the electric power feedback arrangement is that it permits the utilization of a plurality of small, inexpensive output pumps in place of one unusually large output pump. In fact, a plurality of separate compressor pumps and reject control decompressors can be employed in the described electric power feedback arrangement. This is especially important for large modular systems having multiple permeators.

Referring specifically to the embodiment illustrated in FIG. 2, untreated liquid is fed through conduits 50 and 52 to constant pressure pump 54, after any desired filtering by filter 51. The liquid is then pumped through conduit 56 to multiple permeators 58, 59, 60, 61, 62, and 63. Permeate, or treated liquid, leaves the multiple permeators through conduit 65. The reject output from permeators 58, 59 and 60 is combined and passes through conduit 69 into output pump 70. Similarly, reject output from permeators 61, 62 and 63 is combined and passes through conduit 74 into output pump 75. The reject output then passes from permeators 70 and 75 into conduit 77 for discharge. Motors 78 and 80 are connected to output pumps 70 and 75, respectively, and are also connected by three-phase electric power to constant pressure pump 54 to obtain the "electrical gearing" described above. If desired, a safety valve arrangement 82 can be added to the illustrated embodiment.

Motors 78 and 80 can be AC induction motors, synchronous motors or DC motors operating as electric generators. The output pumps 70 and 75 are positive displacement hydraulic motors which are regulated by motors 78 and 80.

The conversion ratio in the embodiment illustrated by FIG. 2 can be adjusted by selection of the number of permeators connected to each output or reject pump.

Specific examples are described below. For purposes of clarity, these examples utilize a single permeator, as well as single input and output pumps.

Flow rate of purified fluid through the membrane of a permeator depends mainly and directly upon the pressure difference across the membrane. In addition, the salt content of the fluid on the input side of the membrane causes an effective back pressure or "osmotic pressure," which for brackish water is typically between 25 and 80 pounds per square inch. Thus, if the applied pressure difference is 675 pounds per square inch and the osmotic pressure is 75 pounds per square inch, then the net pressure across the membrane is 600 pounds per square inch and the flow rate through the membrane is equal to the rate with pure water input and 600 pounds per square inch of applied pressure.

Assuming a required pressure of 675 pounds per square inch and a flow through the membrane of 5 gallons per minute, the input flow into a permeator must be at least 10 gallons per minute in order to operate at a 50 percent conversion (i.e., a reject ratio of 50 percent). By operating a positive displacement pump, such as a 9S3 Moyno pump, at 1,500 revolutions per minute an input flow of 10 gallons per minute at this pressure can be achieved. Another positive displacement pump, such as a 9S2 Moyno pump, operated at about 1,600 revolutions per minute can be used as the reject control decompressor to handle the 5 gallons per minute of reject material. With the required pump speeds, it is only necessary to choose pulley diameters for the two pumps and the motor which turns at about 1,750 revolutions per minute (r.p.m.). Desirably, the input "compressor" pump is made to turn about 15 percent faster than the calculated 1,500 r.p.m. to assure stable pressure control. The power required for this operation is about 4 horsepower (HP).

For water with low-mineral content a conversion of 75 percent (i.e., a reject ratio of 25 percent) can be obtained, for example, by using a positive displacement pump, such as a 9S3 Moyno pump, operated at a minimum of 1,100 r.p.m. as the input "conpressor" pump and using a positive displacement pump, such as a 9S2 Moyno pump, operated at a speed of 480 r.p.m. as the output "decompressor" pump. The power consumption for this example would be about 3 HP. In order to obtain a conversion of 33 percent (i.e., a reject ratio of 67 percent) for water of a very high-mineral content, in the described system a positive displacement pump, such as a 9S4 Moyno pump, operated at a speed of 1,000 r.p.m. can be used as the input "compressor" pump. A positive displacement pump, such as a 9S3 Moyno pump, operated at a speed of 900 r.p.m. can be used as the output "decompressor" pump. Power consumption for this operation is about 4.1 HP.

From the foregoing, it will be seen that this invention is well adapted to obtain all of the ends and objects hereinabove set forth, together with other advantages which are obvious and which are inherent to the system.

Thus, the liquid treatment system of the present invention not only provides improved stability of permeator operation, simplicity, freedom from manual adjustments, low maintenance and power economy, but also has the ability to tolerate suspended solids in the permeator reject stream without corrosion or clogging.

While primary emphasis has been placed on the purification of water from natural sources, industrial water and waste streams, it will be understood that the system of the present invention has application to some rather complicated chemical separations. For example, this system may be used to process cheese whey, which is the fluid portion of milk obtained by a coagulation of casein during the manufacture of cheese or casein. Some cheese factories have disposed of whey in streams or rivers even though it is an objectionable pollutant.

This system might also be used to process pulp mill waste streams, i.e., process the dark brown filtrate which results when pulp from a multistage bleaching of kraft paper pulp is obtained.

Another example of the application of the present invention is the treatment of molasses which remains after cane sugar or beet sugar extract is processed by multiple-effect evaporation and crystallization operations. The resulting molasses contains a substantial amount of desirable sucrose, but the high concentration of accompanying nonsugars, such as amino acids, betaine, oxalic acid, etc., makes it difficult to crystallize and recover the sucrose by conventional means.

As many possible embodiments may be made of the invention without departing from the scope thereof, it is to be understood that all matters herein set forth or shown in the accompanying drawings are to be interpreted as illustrative and not in a limiting sense.

What is claimed is:

1. Apparatus for treating liquid comprising:
   a permeator having an input connection, a permeate connection and a reject output connection;
   a compressor pump adapted to deliver liquid under pressure to the input connection of the permeator;
   a single-screw-type positive displacement hydraulic motor having a helical rotor and a rubber stator in compression fit adapted to remove reject liquid from the reject output connection of the permeator, wherein said single-screw-type positive displacement hydraulic motor is used to return energy of the reject liquid material decompression in the form of electric power feedback and thereby reduce the net power consumption for operating the compressor pump; and
   means for regulating the positive displacement hydraulic motor such that the ratio of reject liquid removed from the reject output connection of the permeator to liquid delivered to the input connection of the permeator is maintained between 25 and 67 percent.

2. The apparatus of claim 1 in which the means for regulating the single-screw-type positive displacement hydraulic motor is an electric motor.

3. The apparatus of claim 2 in which the electric motor is an AC induction motor.

4. The apparatus of claim 2 in which the electric motor is a synchronous motor.

5. The apparatus of claim 2 in which the electric motor is a DC motor.

6. The apparatus of claim 1 in which the single-screw-type positive displacement hydraulic motor is a Moyno pump operated as a motor.

7. The apparatus of claim 1 in which the compressor pump is a multistage centrifugal pump.

8. The apparatus of claim 1 in which the compressor pump is a positive displacement pump shunted by a pressure regulating relief valve.

9. The apparatus of claim 1 in which the compressor pump is operated at a speed in excess of that required to maintain stable pressure control in the permeator.

10. The apparatus of claim 1 in which the permeator has membranes in the form of hollow fibers.

11 The apparatus of claim 1 in which additional permeators are employed in parallel arrangement with said permeator.

* * * * *